Dec. 17, 1940.  A. F. DITTMER  2,225,040
APPARATUS FOR FINISHING CONTACT LENSES
Filed Dec. 31, 1938  5 Sheets-Sheet 3
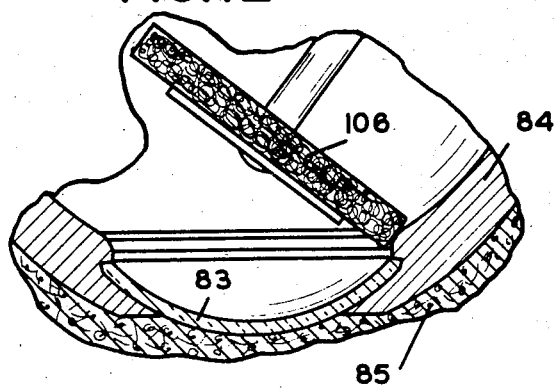
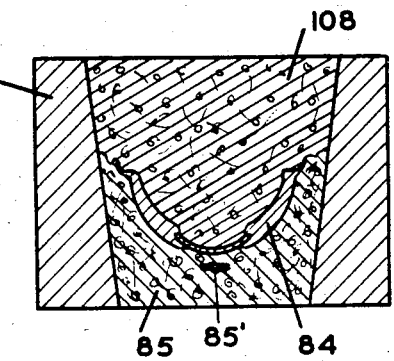
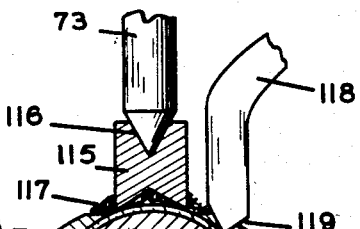
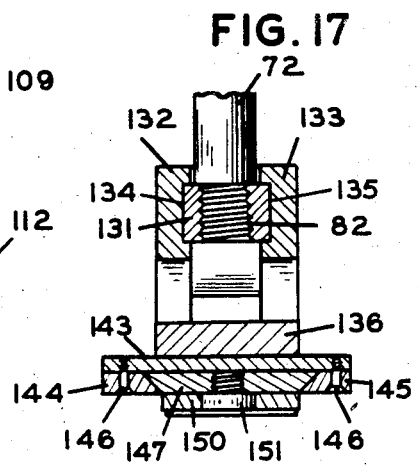
ARTHUR F. DITTMER
INVENTOR
BY
ATTORNEYS

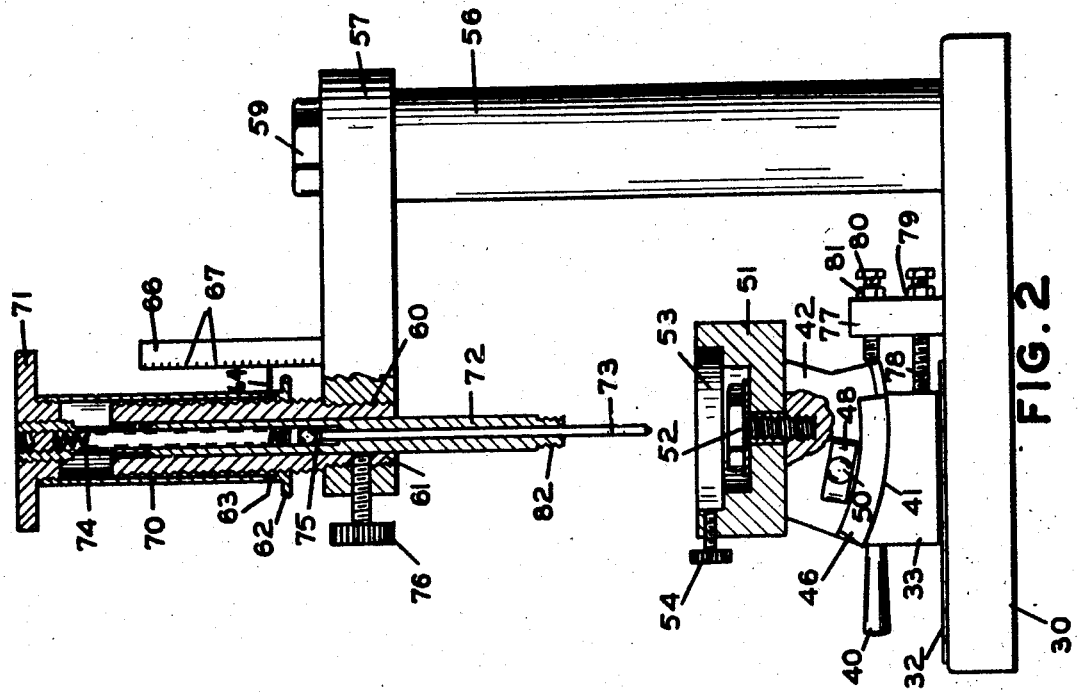
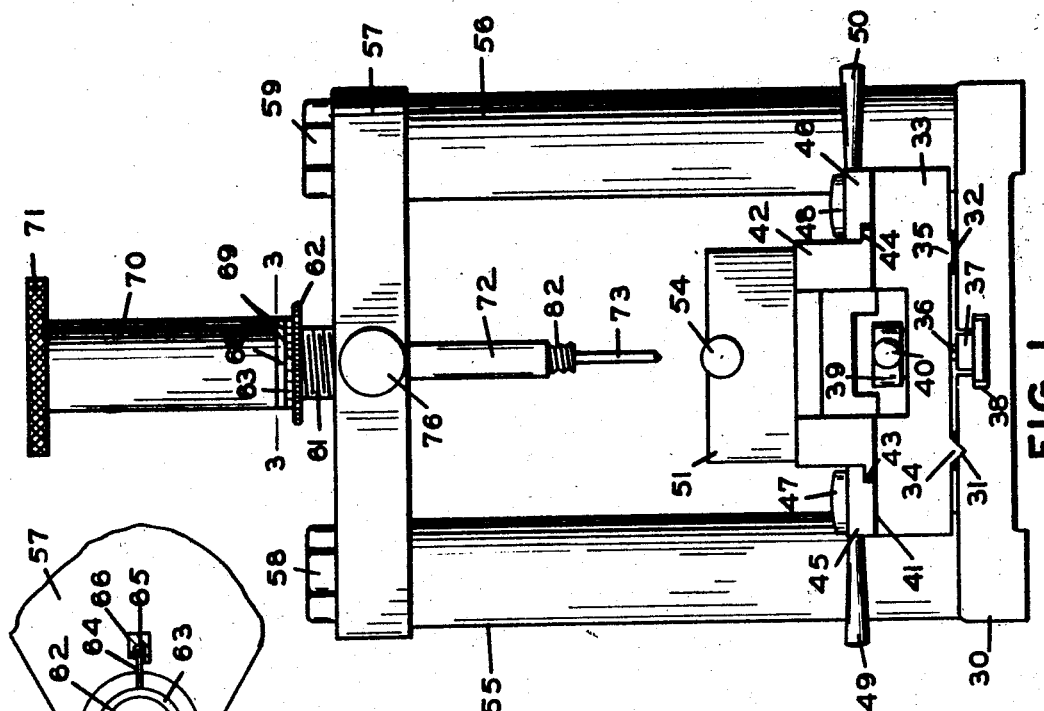
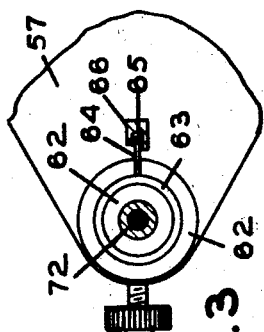
ARTHUR F. DITTMER
INVENTOR

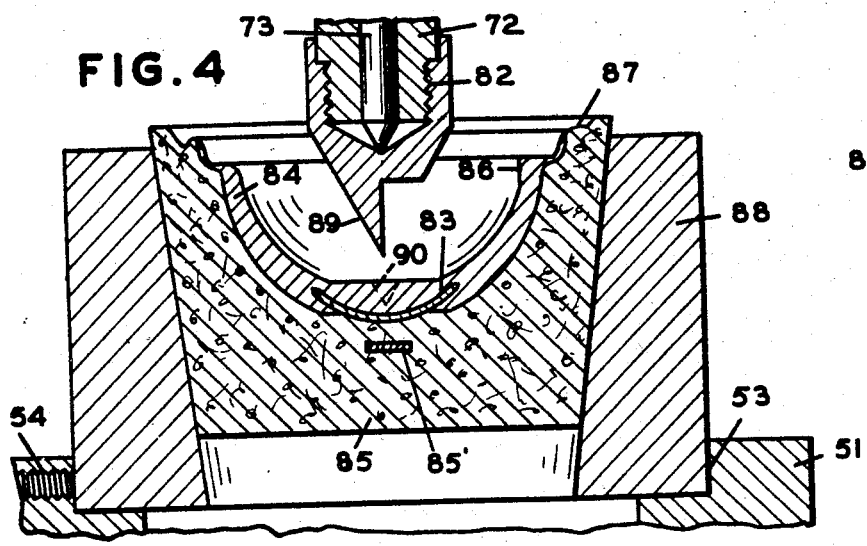
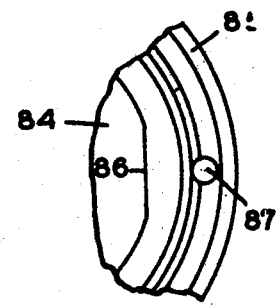
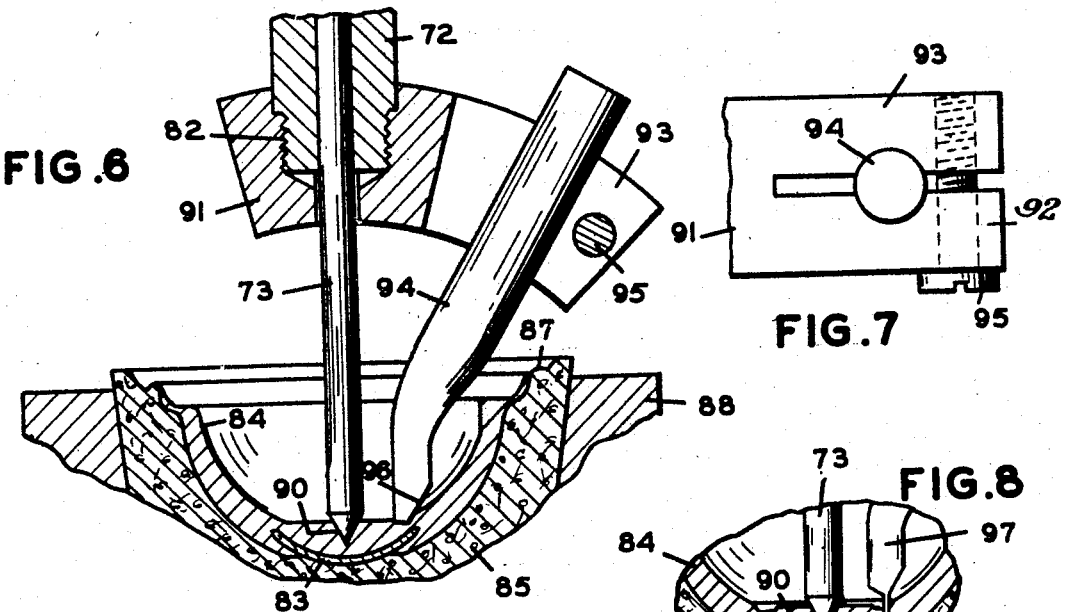
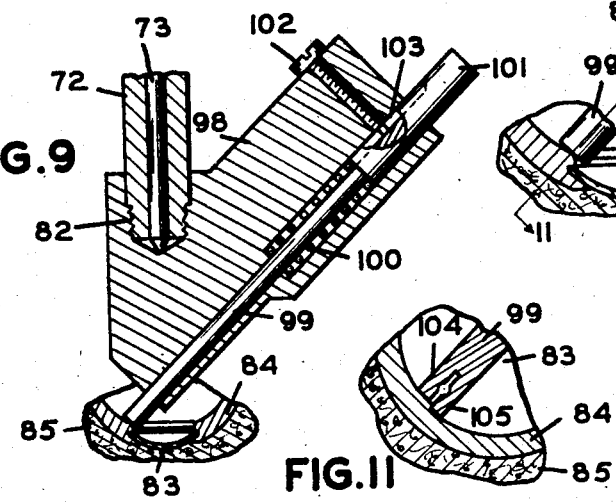
ARTHUR F. DITTMER
INVENTOR

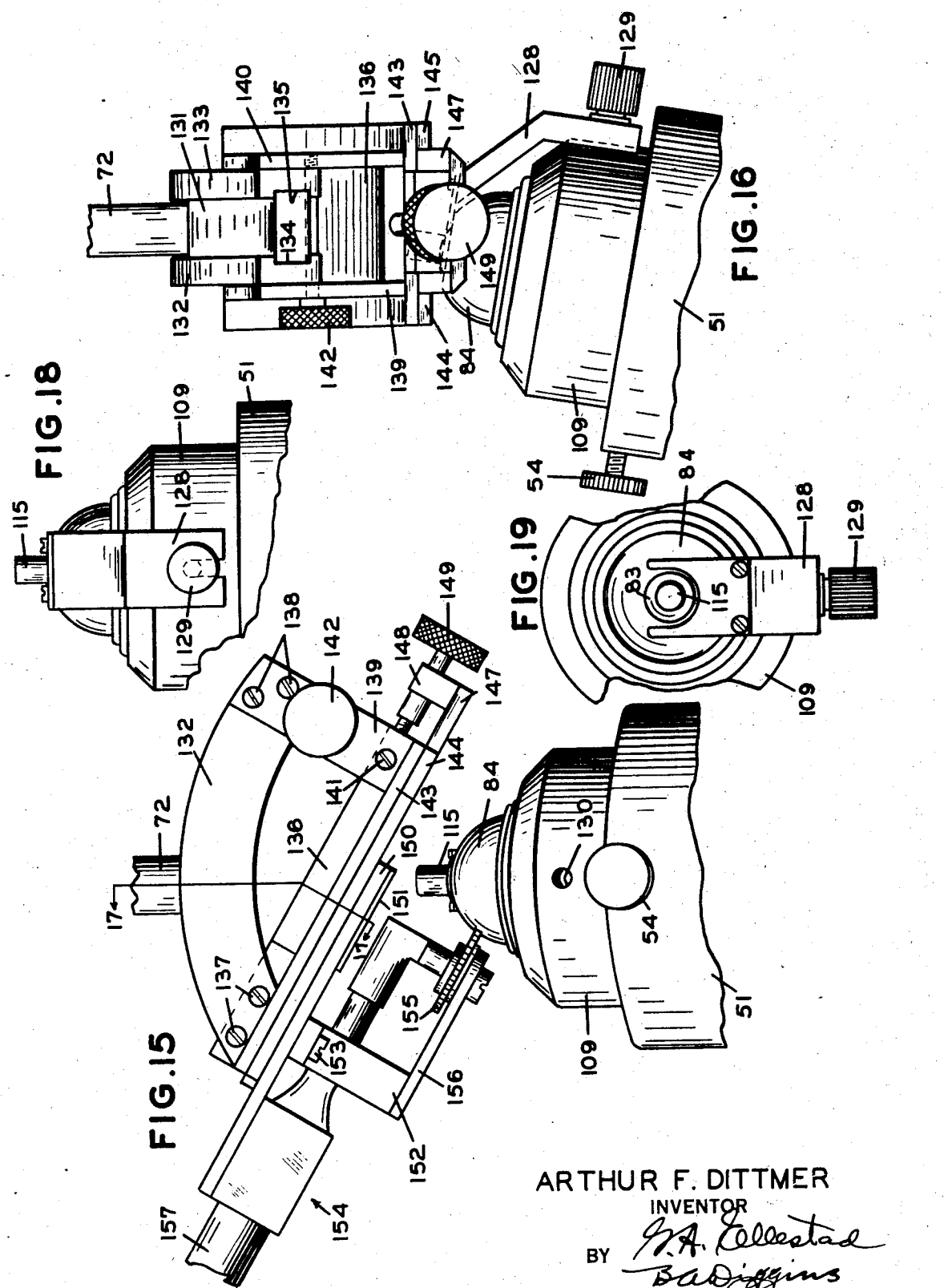

Dec. 17, 1940.   A. F. DITTMER   2,225,040
APPARATUS FOR FINISHING CONTACT LENSES
Filed Dec. 31, 1938    5 Sheets-Sheet 5

ARTHUR F. DITTMER
INVENTOR
BY
ATTORNEYS

Patented Dec. 17, 1940

2,225,040

UNITED STATES PATENT OFFICE 2,225,040

APPARATUS FOR FINISHING CONTACT LENSES

Arthur F. Dittmer, Rochester, N. Y., assignor to Bausch & Lomb Optical Company, Rochester, N. Y., a corporation of New York Application December 31, 1938, Serial No. 248,831

8 Claims. (Cl. 29—26)

The present invention relates to an apparatus for finishing contact lenses of the type having a glass corneal lens and a molded scleral rim of plastic material.

From experiment, it has been determined that there are five main factors affecting the fit of contact lenses. These factors are: (1) the radius of curvature of the scleral rim in the horizontal meridian; (2) the radius of curvature of the scleral rim in the vertical meridian; (3) the corneal build up, or the amount the rear surface of the corneal lens is spaced from the contacting surface of the scleral rim; (4) the overall size of the scleral rim; and (5) the position of the corneal lens in the scleral rim. Other factors such as the smallest diameter of the scleral rim about the corneal lens and the shape of the joint between the scleral rim and the corneal lens are also important.

The corneal build up and radii of curvature in the vertical and horizontal meridians, are taken care of in a suitable molding process such as that described and claimed in my copending application Serial No. 248,832, filed concurrently herewith and entitled Apparatus for making contact lenses. The contact lenses are, however, molded so that the corneal lens is in the center of the scleral rim and the scleral rim is much larger than it should be for a finished contact lens. The molding process also fails to form a proper transition surface between the contacting surface of scleral rim and the corneal lens. The molding process thus insures uniformity of the first three variables while the method and apparatus of the present invention secures uniformity of the other variables and also of the joint between the corneal lens and scleral rim.

One of the objects of the present invention is to provide a method and apparatus for making contact lenses to close and measurable limits. Another object is to provide a contact lens having a reproducible transition surface between the contacting surface and the corneal lens and to provide a method and apparatus for forming this transition surface. A further object is to provide a new and improved method and apparatus for finishing contact lenses. Still another object is to provide an improved method and apparatus for forming contact lenses to a predetermined size and decentration. These and other objects and advantages reside in certain novel features of construction, arrangement and combination of parts and processes as will hereinafter be more fully set forth and pointed out in the appended claims.

Referring to the drawings:

Fig. 1 is a front elevation of my apparatus for finishing contact lenses.

Fig. 2 is a side elevation thereof with parts in section.

Fig. 3 is a section taken on line 3—3 of Fig. 1.

Fig. 4 is a vertical section showing the first step in the process of finishing the lens.

Rig. 5 is a fragmentary plan view of the edge of the molded scleral rim of the lens.

Fig. 6 is a vertical section showing the second step in the finishing process.

Fig. 7 is a fragmentary plan view of the tool holder used in the second step.

Fig. 8 is a vertical section showing the third step of the process.

Fig. 9 is a vertical section showing the fourth step in the finishing process.

Fig. 10 is an enlarged fragmentary vertical section showing the fourth step in the finishing process.

Fig. 11 is a section taken on line 11—11 of Fig. 10.

Fig. 12 is a vertical section showing the fifth step in the finishing process.

Fig. 13 is a vertical section showing the sixth step in the finishing process.

Fig. 14 is a vertical section showing the seventh step in the finishing process.

Fig. 15 is a front elevation of the mechanism for cutting the lens to size.

Fig. 16 is a side elevation thereof.

Fig. 17 is a section taken on line 17—17 of Fig. 15.

Fig. 18 is a side elevation of the lens clamp.

Fig. 19 is a top plan view of the lens clamp.

Figure 20:
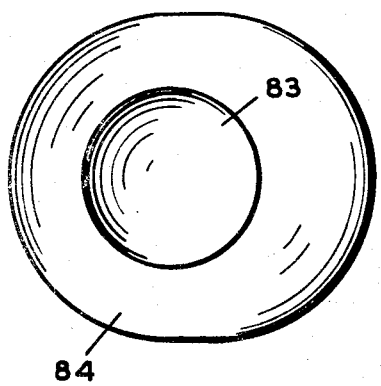

Fig. 20 is a rear view of a finished contact lens.

Figure 21:
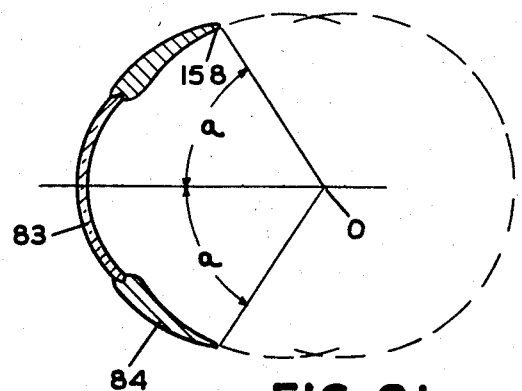

Fig. 21 is a vertical section thereof.

Figure 22:
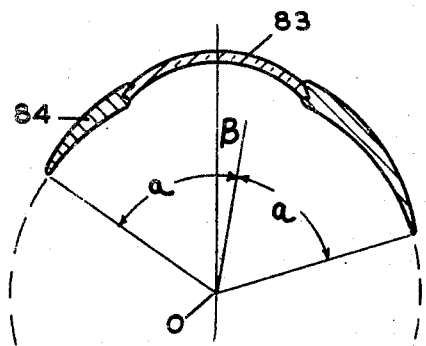

Fig. 22 is a horizontal section thereof.

Figure 23:
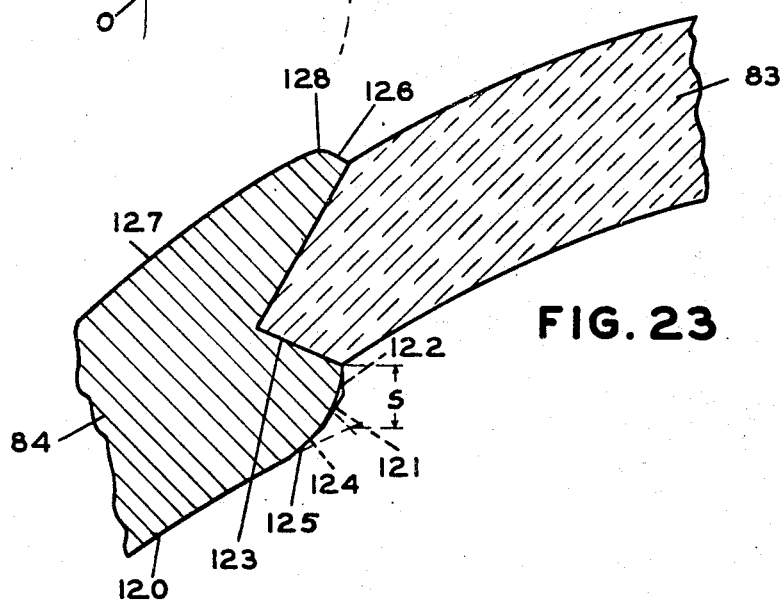

Fig. 23 is an enlarged sectional view showing the construction of the joint between the corneal lens and the scleral rim.

The apparatus for finishing contact lenses according to the present invention is illustrated in Figs. 1 to 3 wherein 30 designates a base having a flat top provided with bearing surfaces 31 and 32. A block 33 having bearing surfaces 34 and 35 is slidably mounted on the base 30 and carries a depending screw 36 with an enlarged head 37 which extends into a slot 38 in the base 30. A nut 39 having a handle 40 is threaded on the upper end of the screw 36 and serves to draw the head 37 into clamping engagement in the slot 38 to lock the block 33 in selected position relative to the base 30.

The block 33 has an arcuate top surface 41 upon which a support 42 is slidably mounted. This support has two outwardly projecting flanges 43 and 44 extending under guides 45 and 46, respectively, which are loosely secured to the block 33 by screws 47 and 48, respectively. These screws 47 and 48 are provided with handles 49 and 50, respectively, and tightening the screws 47 and 48 by means of the handles 49 and 50 causes the guides 45 and 46 to engage the flanges 43 and 44 and lock the support 42 relative to the block 33.

A chuck 51 is secured on top of the support 42 by a nut 52. This chuck 51 has a cylindrical work receiving recess 53 and a suitable set screw 54 serves to clamp the work in the recess 53.

Two upright posts 55 and 56 are secured at the rear end of the base 30 and a flat plate 57 is secured on top of these posts by nuts 58 and 59 and projects forwardly over the base 30. Directly over the chuck 51, the plate 57 has a tapped hole 60 in which is secured a sleeve 61. This sleeve 61 is threaded above the plate 57 and carries a nut 62. A washer 63 rests on top of the nut 62 and is held against rotation by a projection 64 which engages in the groove 65 of an upright 66 secured on top of the plate 57. The upright 66 is preferably graduated as indicated at 67 adjacent the projection 64 and an index 68 on the washer 63 cooperates with graduations 69 on the nut 62. The graduations on the nut 62 and upright 66 thus serve to indicate the vertical position of the nut 62 on the sleeve 61 with great accuracy.

A sleeve 70 extending loosely over the sleeve 61 rests on top of the washer 63 and carries at its upper end an enlarged knob 71. A third sleeve or tool spindle 72 is slidably and rotatably mounted within the sleeve 61 and is secured to the knob 71. A pointed rod 73 slidably and rotatably mounted in the sleeve 72, is pressed downwardly by a coil spring 74 and has an enlarged head 75 to limit the downward movement. The tension of this spring is set by a screw plug threaded into the top of the sleeve 72. A set screw 76 extends through the plate 57 and sleeve 61 and may be screwed into engagement with the sleeve 72 to lock it against movement. The lower end of the sleeve 72 is threaded at 82 to receive the various tools used in the finishing process.

The center of the chuck 51 should be directly under the pointed rod 73 and to insure this positioning, the base 30 is formed with a projection 77 through which a screw 78 extends toward the block 33. This screw 78 is adjusted until it stops the block 33 in proper alignment with the rod 73 and is then fixed in position by a lock nut 79. A similar screw 80 extends through the projection 77 to act as a stop for the support 42 and is similarly fixed in position with a lock nut 81.

When the contact lens is molded in the manner described in my above-mentioned copending application, the outside surfaces of the molds used in the molding process are made with a conical outside surface and the geometric center of the lens forming portion of the mold is located very accurately with respect to these conical surfaces. This mold shape insures accurate centering of the molds when they are transferred to the various fixtures used in the finishing process and also locates the geometric center of the lens along the axis of the fixture. After the contact lens has been molded and vulcanized, the molds are separated and the contact lens blank remains in the female mold. It is with this molded blank that the present invention begins.

Referring now to Fig. 4, the molded contact lens consists of a glass corneal lens 83 embedded in the plastic 84 and both adhering to the female mold 85 of dental stone being locked therein by a suitable clamp 85'. The plastic 84 extends over the rear surface of the corneal lens 83 and is much larger than the final scleral rim is to be. For the purpose of accurately locating the meridians of the molded scleral surface, irregularities such as the flat portion 86 and the projection 87 are formed in the plastic 84 and mold 85, respectively, in the molding process.

The mold 85 carrying the contact lens is placed in a conical adapter 88 and the adapter 88 is secured in the recess 53 of the chuck 51 by the set screw 54. A center drill 89 is secured on the end 82 of the sleeve 72 and a depression 90 is formed in the plastic 84 in alignment with the center of the corneal lens 83. The tool 89 is then removed and a tool holder 91 substituted. The tool holder 91 has its end bifurcated to form two arms 92 and 93 between which the tool 94 is clamped by means of a screw 95.

The rod 73 engages in the depression 90 for accurate centering and the cutting edge 96 of the tool 94 is so shaped as to cut a conical groove in the plastic 84 back of the lens 83. The angle, depth, and radius of this groove is determined by experience in the actual fitting of contact lenses. I have found that a sixty degree cut, 3 mm. deep and 12 mm. in outside diameter is satisfactory but obviously other angles, depths and sizes could be used.

The tool 94 is then removed and a tool 97 substituted therefor. This tool 97 cuts a cylindrical surface from the bottom of the sixty degree surface straight through to the corneal lens 83 and the plastic 84 behind the lens 83 is removed.

The tool holder 91 is then removed and a bracket 98 is mounted on the end 82 of the sleeve 72. A chamfering tool 99 is slidably mounted in the bracket 98 and is urged away from the work by a spring 100 which engages the enlarged head 101 of the tool 99. The tool 99 is manually pressed into engagement with the work. A screw 102 extends through the bracket 98 into a slot 103 in the head 101 of the tool 99 to hold the tool against rotation in the bracket. The cutting end of the tool 99 is slotted to form two arms 104 and 105, the arm 105 being slightly longer than the arm 104 and having the actual cutting surface. The chamfering tool 99 may be set at any desired angle and I have found that an angle of forty-five degrees is satisfactory. This chamfered surface extends between the sixty degree conical surface and the contacting surface. Although this chamfered surface may or may not be truly conical, according to geometry, the term "conical surface" as used in the claims is to be construed as including this chamfered surface.

The sharp edges formed by these cut surfaces are then rounded and polished by means of the buffing wheel 106 illustrated in Fig. 12. An ordinary felt dentist's polishing wheel is suitable for this purpose and a very fine abrasive such as pumice or rouge in water suspension is used on the wheel 106. This buffing or polishing operation does no more than break and smooth the sharp edges formed by the cut surfaces.

The inside joint between the corneal lens 83 and the plastic 84 is now complete and, since it is formed by accurately set tools, is entirely reproducible. The female plaster mold 85 carrying the lens 83 and plastic 84 is then placed in a tapered form 107 and the hollow plastic contact lens blank 84 is filled with a suitable plaster 108 such as plaster of Paris to form a male mold. The two molds with the plastic 84 and lens 83 between them are then removed from the form 107 and the female stone mold 85 is cut away leaving the contact lens blank 84 on the male mold 108.

The male mold 108 is placed in an adapter 109 which has a central conical hole 110 having the same taper as the form 107. The adapter 109 has two oppositely disposed slots 111 and 112 near its large opening for receiving a plate 113. A screw 114 threaded through the plate 113 bears against the lower end of the male mold 108 and forces it toward the small end of the conical hole 110 thus both centering the mold 108 and locking it in the adapter 109. The geometric center of the lens forming portion of the mold 108 also occupies a predetermined position about the axis of the adapter as explained above. This adapter 109 is then secured in the seat 53 of the chuck 51 and locked in position by the set screw 54.

A small metal bearing member 115 having a central depression 116 for receiving the point of the rod or plunger 73 is secured centrally of the lens 83 by sealing wax 117 or other suitable adhesive. A suitable tool 118 is mounted in a bracket such as the bracket or fixture 93 which is secured on the end 82 of the tool spindle 72 and the plastic 84 is cut through to the outside edge of the bevel of the lens 83. The cutting face 119 may be formed at any desired angle but I prefer setting this cutting face at an angle of about thirty degrees. This angle leaves the plastic thick near the edge and hence prevents any warping, splitting or cracking which would irritate the eyelids.

The sharp corner between the cut surface and the outside molded surface of the plastic rim 84 is then rounded by means of a polishing wheel similar to that shown in Fig. 12.

The joint between the lens 83 and the plastic 84 is now complete and has the appearance shown in Fig. 23. The inner contacting surface 120 of the rim 84 is formed in the molding process and needs no finishing. The surface indicated at 121 is the conical surface formed by the edge 96 of the tool 94 and the cylindrical surface 122 is the one formed by the tool 97. This surface 122 joins the lens 83 at the edge of the bevel 123. The surface 124 is that formed by the chamfering tool 99 and the final surface 125 is the final surface after the polishing wheel 106 has rounded the edges formed in the cutting. The amount of the corneal build-up S is determined in the molding process.

On the convex side, the surface 126 is that formed by the cutting edge 119 of the toool 118 and this surface is rounded or polished into the outside surface 127 of the rim 84 as indicated at 128.

After the joint is complete, it is necessary to cut the rim 84 to the proper size with the rim 83 at the proper decentration. The size is preferably determined by angular measure as indicated in Figs. 21 and 22. The angle determining the overall size of the rim 84 is the angle 2α whose apex is located at the center of the torus. The angle β in Fig. 22 designates the amount of decentration. These angles α and β are determined by experiment and are preferably fixed for each lens of the test set.

The decentration is obtained by rotating the torus about its center through the angle β prior to cutting the rim 84 to size. The mechanism for cutting the rim is shown in Figs. 15 to 19.

For this cutting, the rim 84 is first secured to the mold 108 by a clamp 128 which is removably secured to the adapter 109 by a screw 129. The adapter 109 has two oppositely disposed threaded holes, one of which is indicated at 130 in Fig. 15, for receiving the screw 129. The two holes are provided so that the clamp 128 can be moved to different positions thus permitting the plastic to be cut around its entire periphery.

The adapter 109 carrying the mold and contact lens is then locked in the chuck 51 by the set screw 54. The chuck 51 and adapter 109 are designed so that the geometric center 0 of the lens forming torus is located at the center of curvature of the arcuate surface 41 so that moving the support 42 on the surface 41 of the block 33 causes the contact lens to tilt about its center 0. The decentration is thus obtained by setting the support 42 at the angle β and locking it in position by the screws 47 and 48. Suitable cooperating marks, not shown, on the support 42 and guides 45 and 46, serve to indicate the angle β.

The cutting attachment consists of an arcuate block 131 secured on the end 82 of the sleeve 72. Two arcuate arms 132 and 133 having grooves 134 and 135, respectively, slidably engage the opposite sides of the block 131. These arms 132 and 133 are suitably secured at one end to a support 136 by screws or bolts 137 and are secured at their other ends by screws or bolts 138 to brackets 139 and 140, respectively. These brackets 139 and 140 are in turn secured to the support 136 by a screw or bolt 141. A screw 142 extending through the bracket 139 is threaded in the bracket 140 and serves to draw the brackets 139 and 140 together and thus lock the arms 132 and 133 relative to the block 131.

Mounted on the bottom of the support 136 is a plate 143 to which two dove-tailed guides 144 and 145 are secured by screws or bolts 146. A slide 147 is movably mounted between these guides and carries at its outer end an upstanding bracket 148 in which a screw 149 is rotatably mounted. This screw 149 is threaded in the support 136 so that rotation of the screw causes sliding movement of the slide 147 relative to the guides 144 and 145.

A plate 150 is rotatably secured on the bottom of the slide 147 by a shoulder screw 151 and carries a bracket 152 secured thereto by screws 153 for receiving a fixture indicated generally at 154.

This fixture 154 may be a dental right angle hand piece. A cutting tool such as the saw 155 is secured on the hand piece 154 and a plate 156 attached to the bracket 152 extends over and braces the saw 155. The fixture 154 is mounted in the bracket 152 so that the axis of rotation of the saw is coincident with the axis of rotation of the plate 150. The hand piece 154 is driven from a source of power, not shown, through the cable 157. The mold 108 was made of the soft plaster of Paris rather than the harder dental stone to reduce the wear on the teeth of the saw 155.

In operation, the arms 132 and 133 are moved relative to the block 131 until the slide 147 is at an angle of approximately α to the sleeve 72 and the arms are then locked in position by the screw 142. The angle α is indicated by suitable cooperating marks, not shown, on the block 131 and arms 132 and 133. When the angle α is fixed for the entire series of lenses, this angular setting is made only once. The saw 155 is then set at the proper height for each lens by means of the micrometer nut 162 of Fig. 1. The saw is then fed into the plastic 84 by means of the feed screw 149 and the rim 84 cut to size.

After the rim 84 has been cut to size, the convex surface is ground down until the rim reaches the desired finished thickness, about ½ mm. and the convex surface is then polished. The edge 158 in Fig. 21 is then rounded and polished. These operations can be carried out holding the lens by hand against a suitable grinding or polishing wheel.

From the foregoing it will be apparent that I am able to attain the objects of my invention and provide a method and apparatus for finishing contact lenses so that they are reproducible to very close tolerances. Various modifications can, of course, be made without departing from the spirit of my invention or the scope of the appended claims.

I claim:

1. In a device for finishing contact lenses of the type having a glass corneal portion and a scleral rim portion of synthetic resin, an apparatus for holding the lens in predetermined position for engagement by a tool comprising a mold having a lens engaging portion shaped to conform to one surface of the contact lens and a conical locating portion, the radius and angle of the conical locating portion being fixed relative to the geometric center of the lens locating portion, and an adapter having a conical opening for receiving the mold, the radius and angle of the opening being selected to hold the mold in a predetermined position relative to said adapter.

2. In a device for finishing contact lenses of the type having a glass corneal portion and a scleral rim portion, a chuck, a cutting tool, and means for securing a lens in the chuck in predetermined relation to said tool, said means comprising a mold having a lens engaging portion shaped to conform to one surface of the contact lens and a conical locating portion, the radius and angle of said locating portion being fixed relative to the geometric center of said lens engaging portion and the axis of said cone passing through said center, an adapter having a conical opening for receiving said mold, the angle and radius of said opening being fixed to locate said mold so that the geometric center of said engaging portion occupies a fixed location relative to said adapter, and cooperating means on said adapter and said chuck for locating said adapter in predetermined relation to said cutting tool.

3. An apparatus for reproducibly cutting the rim of a contact lens to a predetermined size, comprising a base, a chuck movably mounted on said base for arcuate movement about an axis parallel to said base, means for locking said chuck relative to said base, means for securing a contact lens on said chuck with its geometric center in a fixed relation to said chuck, a plate carried by said base and extending over said chuck, a tool spindle rotatably and slidably mounted in said plate in axial alignment with said chuck, a tool support carried by said spindle, a cutting tool carried by said support at a predetermined angle to said spindle, means for sliding said tool spindle to locate the tool relative to said contact lens, and means for moving the tool to cut said contact lens.

4. An apparatus for cutting a contact lens of the type having a glass corneal lens and a molded scleral rim of synthetic resin, so that the lens is decentered in the rim by a predetermined angle, comprising a base, a chuck movably mounted on said base for arcuate movement about an axis parallel to said base, means for locking said chuck relative to said base at said predetermined angle, means for securing a contact lens on said chuck with its geometric center on said horizontal axis, a plate carried by said base and extending over said chuck, a tool spindle rotatably and slidably mounted in said plate, the axis of rotation of said tool intersecting said horizontal axis substantially perpendicularly at said center, a cutting tool carried by said spindle and rotatable therewith and means for moving said spindle to bring said cutting tool line into engagement with the scleral rim of said lens.

5. An apparatus for finishing contact lenses comprising a base, a support slidably mounted on said base, a chuck movably mounted on said support for arcuate movement about a horizontal axis, means on said chuck for holding a contact lens to be finished, an upright carried by said base in spaced relation to said support, a plate carried by said upright and extending over said chuck, a vertical tool spindle slidably and rotatably carried by said plate above and in alignment with said chuck, means on said spindle for supporting a lens finishing tool and means for sliding said spindle to adjust the position of said tool relative to said chuck.

6. An apparatus for forming a decentered composite contact lens comprising a base, a chuck movably mounted on said base for arcuate movement about an axis parallel to said base, a lens support having a lens receiving surface shaped to conform to one surface of the lens, means for securing the lens support in said chuck so that the geometric center of the lens receiving surface lies on the axis of movement of said chuck, a spindle rotatably carried by said support so that its axis perpendicularly intersects the axis of movement of said chuck at the geometric center of the lens receiving surface of the lens support, and a cutting tool carried by said spindle for cutting a lens positioned on said support.

7. An apparatus for reproducibly cutting the rim of a contact lens to a predetermined size comprising a base, a chuck movably mounted on said base for arcuate movement about an axis parallel to said base, means for locking said chuck relative to said base, means for securing a contact lens on said chuck with its geometric center on the axis of arcuate movement of said chuck, a vertical cylindrical bearing carried by said base above and in alignment with said chuck, a tool spindle slidably and rotatably mounted in said bearing, a tool support carried by said spindle, a cutting tool movably carried by said support at a predetermined angle to said spindle, means for sliding said spindle to locate the tool relative to said contact lens and means for moving said tool on said support to cut said contact lens.

8. An apparatus for finishing contact lenses comprising a base, a chuck movably mounted on said base for arcuate movement about a horizontal axis, a vertical cylindrical bearing carried by said base above and in alignment with said chuck, a tool spindle slidably and rotatably mounted in said bearing, means on the lower end of said spindle for supporting a lens finishing tool and means for sliding said spindle in said bearing to adjust the position of the tool relative to said chuck.

ARTHUR F. DITTMER.